Nov. 22, 1966    J. KEYLWERT    3,286,697
ROTARY PISTON INTERNAL COMBUSTION ENGINE
AND METHOD OF OPERATING SAME
Filed May 24, 1963    2 Sheets-Sheet 1
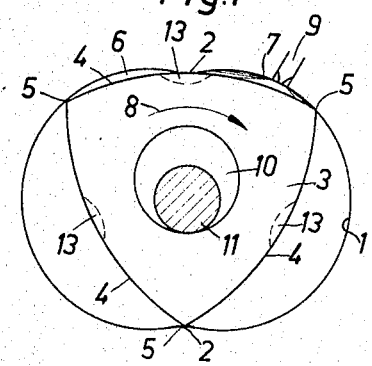
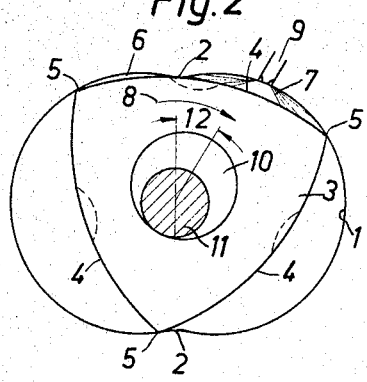
Inventor:
Johann Keylwert
by Walter Becker Nov. 22, 1966  J. KEYLWERT  3,286,697
ROTARY PISTON INTERNAL COMBUSTION ENGINE
AND METHOD OF OPERATING SAME
Filed May 24, 1963  2 Sheets-Sheet 2

Inventor:
Johann Keylwert
By Walter Becker

United States Patent Office 3,286,697
Patented Nov. 22, 1966

3,286,697
ROTARY PISTON INTERNAL COMBUSTION ENGINE AND METHOD OF OPERATING SAME
Johann Keylwert, Cologne-Kalk, Germany, assignor to Klockner-Humboldt-Deutz Aktiengesellschaft, Cologne, Germany
Filed May 24, 1963, Ser. No. 283,668
Claims priority, application Germany, May 26, 1962, K 46,852
4 Claims. (Cl. 123—8)

The present invention relates to a rotary piston internal combustion engine and method of operating the same and, more particularly, relates to a circular piston internal combustion engine with the formation of an inner mixture by injection of fuel into the combustion chamber by means of one or more fuel injection nozzles, in which the enveloping body surrounding the piston and therewith confining the working chambers has an inner confining surface which at the combustion chamber has an axis near zone subdividing said combustion chamber into chambers of a crescent-shaped cross section, whereas the outer circumferential surface of the piston has axis parallel zenith edges by means of which it engages the inner confining surface of the above mentioned enveloping body and subdivides the working chambers.

With a rotary piston internal combustion engine of the above mentioned type it is rather difficult efficiently to exploit the air and to obtain a high medium working pressure during the combustion process. The reason for this difficulty is seen in the fact that in particular in the upper dead center position of the piston no closed combustion chamber is formed which makes possible to receive sufficient combustion air for a direct fuel jet injection. This is due to the large dimensions of the combustion chamber in the circumferential direction of the piston which dimensions are determined by the contours of the enveloping surface of the piston and the inner confining surface of the enveloping body. If the fuel injection nozzle is arranged within the region of the axis near zone of the inner confining surface of the enveloping body and if in the piston there is provided a combustion chamber trough, the shape of which is adapted to the fuel jets, a uniform combustion chamber will be obtained within the range of the fuel injection nozzle, but it is not possible in view of the great distance properly to exploit the air in the combustion chambers of crescent-shaped cross section for purposes of combustion.

Moreover, a trough in the piston requires a considerable increase in the basic dimensions of the engine if an effective compression ratio is to be maintained. By the progressive ignition of the fuel in the longitudinal chambers of crescent-shaped cross section pressure differences upon the piston surface occur which may overload the transmission for the kinematic guiding of the piston. The same danger of overloading the transmission exists when a plurality of fuel injection nozzles are distributed over the two combustion chambers of crescent-shaped cross section for better exploitation of the air.

It is, therefore, an object of the present invention to provide a rotary piston internal combustion engine and method of operating same, which will overcome the above mentioned drawbacks.

It is another object of this invention to provide a rotary piston internal combustion engine which will be smaller in size and will better exploit the combustion air than has been possible with heretofore known rotary piston internal combustion engines of the same stroke volume and the same effective compression ratio.

These and other objects and advantages of the invention will appear more clearly from the following specification in connection with the accompanying drawing, in which:

FIG. 1 diagrammatically illustrates a portion of a rotary piston internal combustion engine according to the present invention.

FIG. 2 shows the same rotary piston internal combustion engine as FIG. 1 but with the piston moved into a different position.

Figure 3:
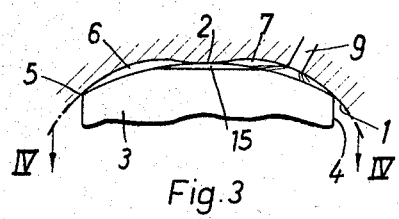
FIGURE 3 shows a modification.

The present invention is characterized primarily in that a small quantity of fuel is injected into the combustion chamber in such a way that the fuel will ignite approximately in the upper dead center position of the piston, said injected quantity of fuel being so selected that during the succeeding expansion the temperature in the combustion chamber will at a certain eccentric angle of for instance from 10 to 40° following the dead center position of the piston be still so high that favorable ignition conditions will exist for the now effective main injection.

Thus, according to the present invention, the time of of main injection for the fuel is to be selected so that at the said time the major portion of the combustion air will be contained in the front combustion chamber of crescent-shaped cross section when looking in the direction of rotation of the piston. At this instance, the rear combustion chamber, when looking in the direction of rotation of the piston, has decreased to such an extent that the component of combustion air therein does not represent a loss for the course of the combustion.

The injection of the fuel may be effected by a pre-injection nozzle and a main injection nozzle. Both nozzles may in a manner known per se structurally be united. The main injection may be effected by a multi-hole nozzle the jets of which are directed along a flat cone toward the piston surface.

One of the basic features of the invention consists in that the main injection is effected only when the piston has moved beyond its upper dead center point to such an extent that a uniform combustion chamber prevails. Accordingly, if desired, when particularly favorable ignition conditions prevail, the pre-injection may be omitted.

Referring now to the drawing in detail, the rotary piston internal combustion engine illustrated therein is of a type according to which the basic form of the inner confining surface 1 of the enveloping body E represents an epitrochoid with two axis near zones 2. In conformity with the epitrochoid, the piston 3 has a peripheral surface 4 with three axis parallel zenith edges 5 by means of which the piston subdivides the working chambers of the engine relative to the inner confining surface 1 of the enveloping body E and also seals said working chambers by means of sealing strips (not shown) in the zenith edges 5.

The rotary piston internal combustion engine shown in the drawing may be a rotary piston internal combustion engine but preferably is a circular piston internal combustion engine. With the last mentioned type it is simpler to provide the necessary devices for introducing the fuel into the combustion chamber.

According to FIGS. 1 and 2, the combustion chamber in the upper dead center position of the piston 3 is formed by the two chambers 6 and 7 of crescent-shaped cross section. When looking in the direction of the arrow 8 which indicates the direction of rotation of the piston, the chamber 6 represents the rear combustion chamber and the chamber 7 represents the front combustion chamber. When piston 3 continues its movement in the direction of the arrow 8 beyond the upper dead center point, the front combustion chamber 6 progressively decreases in size while inversely the rear combustion chamber 7 increases in size. This is clearly shown in FIG. 2. A fuel injection nozzle 9 leads into the combustion chamber 7. Said nozzle 9 is so designed that a small quantity of fuel will be injected into the combustion chamber in such a way that it will ignite approximately in the upper dead center position of the piston. Moreover, the said injected quantity of fuel is so selected that during the subsequent expansion, the temperature in the combustion chamber will at a certain eccentric angle of for instance from 10 to 40° following the upper dead center position of the piston be still so high that favorable ignition conditions exist for the now following main injection. The pre-igition is indicated in FIG. 1 and the main injection is indicated in FIG. 2. FIG 2 also shows that at the instant of the main injection the major portion of the combustion air is, when looking in the direction of the piston, in the front chamber 7. The rear combustion chamber 6 has at that time been reduced in size so that the component of combustion air therein will not mean any loss for the course of the combustion.

Figure 4:
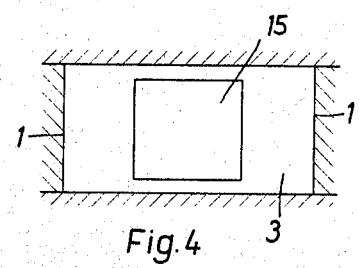
FIGURE 4 is a section on line IV—IV of FIGURE 3.

According to the arrangements shown in FIGS. 1 and 2, no trough or passage is provided for interconnecting the two combustion chambers 6 and 7. As will be evident from the drawing, a multi-hole nozzle is employed as fuel injection nozzle and the jets of said nozzle are directed along a flat cone toward the piston surface. FIGURES 3 and 4, however, show a groove 15 connecting the sectional combustion chambers.

As will be evident from the above, an arrangement according to the present invention will assure that during the course of the main combustion, a uniform combustion chamber will be available for the main combustion while the necessary ignition temperature will be maintained in said combustion chamber due to the precombustion. No material changes in the structure of the engine are required in order to obtain the ignition temperature. As a matter of fact, no troughs or passages have to be provided in the piston so that the engine according to the invention will be smaller in design than heretofore known rotary piston internal combustion engines of the same stroke volume and the same effective compression ratio. This will likewise contribute to a better exploitation of the combustion air.

Inasmuch as the main combustion is effected in a uniform combustion chamber, the danger that in view of a non-symmetric distribution of the pressure a torque is exerted upon the piston through the piston surface and the transmission for kinematically guiding the piston relative to the inner surface of the enveloping body is overloaded, will be considerably reduced.

Figure 5:
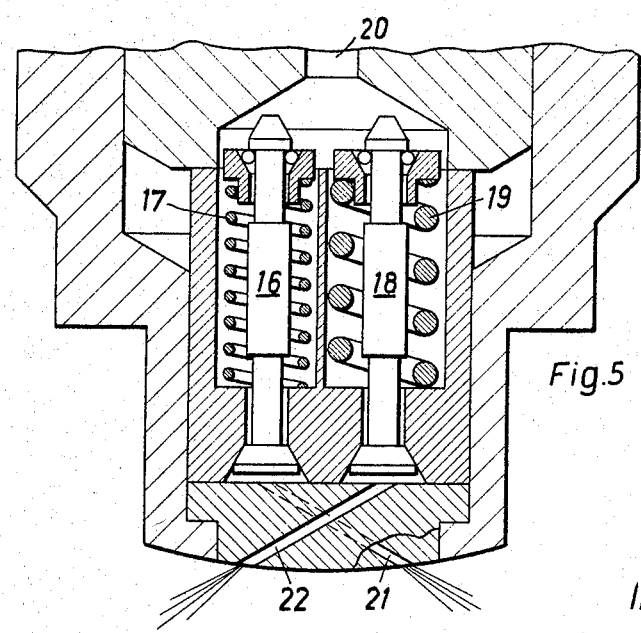
FIGURE 5 shows in section a double nozzle structure.

In FIGURE 5 a nozzle structure is shown wherein valve 16 is held closed by a weaker spring 17 and a valve 18 is held closed by a stronger spring 19. A supply of fuel via passage 20 will first cause valve 16 to open for a supply of fuel via passage 21 to the combustion chamber. Thereafter valve 18 opens for a supply of fuel via passage 22 to the combustion chamber. The proportioning of springs 17 and 19 determine the respective volumes of the fuel injected, as well as the timing of the injection steps.

It is, of course, to be understood that the present invention is, by no means, limited to the particular construction shown in the drawing but also comprises any modifications within the scope of the appended claims.

What I claim is:

1. In a method of operating a rotary piston internal combustion engine, in which the piston is surrounded by a body having a multi-arch inner confining surface confining with said piston a combustion chamber and in the upper dead center position of said piston dividing said combustion chamber into two sectional combustion chambers of crescent-shaped cross section, the steps of: on each combustion cycle first compressing air in the chamber and then injecting a small quantity of fuel into said combustion chamber while said piston is in its upper dead center position or slightly thereafter, and subsequently after a certain angular movement of said piston of from 10° to 40° beyond its upper dead center position injecting into said the front sectional combustion chamber in the direction of piston rotation a second quantity of fuel considerably larger than said first quantity of fuel while proportioning said first quantity of fuel so that after the injection of the latter and following the initiation of the combustion and subsequent expansion of the combustion gases the temperature of the combustion gases in said chamber will be favorable for the injection of said second quantity of fuel.

2. A method according to claim 1, which includes the step of effecting the injection of said second quantity of fuel when the major portion of the combustion air is in the front one of said sectional chambers when looking in the direction of rotation of said piston.

3. A rotary internal combustion engine having a cycle which includes the four phases of intake, compression, expansion and exhaust; said engine comprising an outer body having spaced end walls and a peripheral wall interconnecting said end walls to define, between said walls, a cavity having an axis along which said end walls are spaced, the inner surface of said peripheral wall having basically the profile of a multi-lobed epitrochoid with its lobes being spaced circumferentially about said axis; an inner body received within said outer body cavity and supported for relative rotation with respect to said outer body with the axis of said inner body being laterally spaced from, but parallel to, the axis of said outer body cavity, said inner body having axially-spaced end faces disposed adjacent to and in sealing engagement with said end walls and having an outer surface with a plurality of circumferentially spaced apex portions, one more in number than the number of said lobes, each of said apex portions having its radially outermost edge disposed substantially at said peripheral wall inner surface in all relative positions of said inner and outer bodies, said apex portions having continuous sealing engagement with said peripheral wall inner surface such that the space between the facing surfaces of said inner and outer bodies is divided into a plurality of working chambers which individually vary in volume upon relative rotation of the inner body with respect to the outer body, each portion of the outer surface of the inner body between a pair of adjacent apex portions being such that the adjacent working chamber extends from one of said apex portions to the other in all relative positions of the two bodies; intake passage means having a port opening into said space for consecutively individually inducting air into said chambers as said inner body rotates with respect to the outer body; and exhaust passage means having a port opening into said space for consecutively individually exhausting all of said chambers as said inner body rotates relatively with respect to the outer body, said inner body forming a compression chamber with a wall portion intermediate two apex portions adjacent a meeting line of two lobes which divides said compression chamber into front and rear sectional chambers with the air compressed to minimum volume, and means to inject a smaller fraction of the fuel of combustion into said compression chamber at or after minimum volume and to inject the larger fraction of the fuel for combustion into the front sectional chamber after rotation of said inner body sufficiently to increase substantially the volume of said compression chamber.

4. In the engine claimed in claim 3, in which said means to inject the fuel injects the larger fraction at a point in the rotation of the inner body at least 10° past the position of minimum volume.

References Cited by the Examiner

UNITED STATES PATENTS

| | | | |
|---|---|---|---|
| 2,088,361 | 7/1937 | Bahnsen | 123—8 |
| 2,126,795 | 8/1938 | McIntyre | 123—8 |
| 2,382,259 | 8/1945 | Rohr | 123—8 |
| 2,988,065 | 6/1961 | Wankel et al. | 123—8 |

FOREIGN PATENTS

| | | |
|---|---|---|
| 1,287,176 | 1/1962 | France. |
| 1,326,111 | 3/1963 | France. |

OTHER REFERENCES

Schweitzer—What Can Be Gained by Pilot Injection? In Automotive Industries 79(18), pages 533, 534, October 29, 1938. TL1–A75

Wankel et al.: Bauart und gegenwartiger Entwicklungsstand einer Trockoiden-Rotationskolbenmaschine; In MTZ 21(2), pages 33–45, February 1960, TJ 751–M6.

CARLTON R. CROYLE, *Primary Examiner.*

JOSEPH H. BRANSON, Jr., SAMUEL LEVINE, MARK M. NEWMAN, *Examiners.*

F. T. SADLER, *Assistant Examiner.*